US011558289B2

United States Patent
Kadu

(10) Patent No.: US 11,558,289 B2
(45) Date of Patent: Jan. 17, 2023

(54) HYPERSCALAR PACKET PROCESSING

(71) Applicant: Avago Technologies International Sales Pte. Limited, Singapore (SG)

(72) Inventor: Sachin Prabhakarrao Kadu, Fremont, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

(21) Appl. No.: 17/508,915

(22) Filed: Oct. 22, 2021

(65) Prior Publication Data
US 2022/0045942 A1 Feb. 10, 2022

Related U.S. Application Data

(63) Continuation of application No. 16/730,923, filed on Dec. 30, 2019, now Pat. No. 11,184,278.

(51) Int. Cl.
*H04L 45/42* (2022.01)
*H04L 45/12* (2022.01)
(Continued)

(52) U.S. Cl.
CPC ............ *H04L 45/42* (2013.01); *H04L 45/124* (2013.01); *H04L 45/24* (2013.01); *H04L 45/60* (2013.01); *H04L 47/50* (2013.01)

(58) Field of Classification Search
CPC ......... H04L 45/42; H04L 47/50; H04L 45/60; H04L 45/124; H04L 45/24; H04L 49/90; H04L 49/9042; H04L 49/503
See application file for complete search history.

(56) References Cited

U.S. PATENT DOCUMENTS 6,434,145 B1 * 8/2002 Opsasnick .............. H04L 49/90
370/535
6,804,692 B2 * 10/2004 Davidson ................ H04L 69/12
700/1

(Continued)

FOREIGN PATENT DOCUMENTS

KR 20050087259 8/2005
WO WO 2019/165355 8/2019

OTHER PUBLICATIONS

Extended European Search Report from European Application No. 20208522.1, dated May 10, 2021, 9 pages.

*Primary Examiner* — Mohamed A Kamara
(74) *Attorney, Agent, or Firm* — BakerHostetler

(57) ABSTRACT

The disclosed systems and methods provide hyperscalar packet processing. A method includes receiving a plurality of network packets from a plurality of data paths. The method also includes arbitrating, based at least in part on an arbitration policy, the plurality of network packets to a plurality of packet processing blocks comprising one or more full processing blocks and one or more limited processing blocks. The method also includes processing, in parallel, the plurality of network packets via the plurality of packet processing blocks, wherein each of the one or more full processing blocks processes a first quantity of network packets during a clock cycle, and wherein each of the one or more limited processing blocks processes a second quantity of network packets during the clock cycle that is greater than the first quantity of network packets. The method also includes sending the processed network packets through data buses.

20 Claims, 10 Drawing Sheets

(51) Int. Cl.
  *H04L 45/24*  (2022.01)
  *H04L 45/60*  (2022.01)
  *H04L 47/50*  (2022.01)

(56) References Cited

U.S. PATENT DOCUMENTS

| | | |
|---|---|---|
| 7,743,191 B1 | 6/2010 | Liao |
| 8,335,224 B1 | 12/2012 | Milliken |
| 8,775,685 B1 | 7/2014 | Brebner |
| 10,558,466 B2 | 2/2020 | Breternitz et al. |
| 2004/0128401 A1* | 7/2004 | Fallon .................. H04L 9/40 709/250 |
| 2006/0114914 A1 | 6/2006 | Anand et al. |
| 2015/0067003 A1 | 3/2015 | McLeod |
| 2018/0159790 A1 | 6/2018 | Wang |

* cited by examiner

HYPERSCALAR PACKET PROCESSING

CROSS-REFERENCE TO RELATED APPLICATION

This application is a continuation of application Ser. No. 16/730,923, filed on Dec. 30, 2019, the entirety of which is incorporated herein by reference for all purposes.

TECHNICAL FIELD

The present disclosure generally relates to packet processing, and more specifically relates to methods and systems for providing hyperscalar packet processing to optimize circuit integration, reduce power consumption and latency, and improve performance.

BACKGROUND

In packet processing devices such as network switches and routers, transitioning to smaller processing nodes was often sufficient to meet ever increasing performance targets. However, as the feature size of processing nodes approaches physical limitations, performance improvements become harder to achieve from process shrinkage alone. Meanwhile, high performance computing and other demanding scale out applications in the datacenter continue to require higher performance that is not met by conventional packet processing devices. Latency sensitive applications further require specialized hardware features, such as ternary content addressable memory ("TCAM"), which in turn imposes performance constraints that raise further hurdles in meeting performance targets.

DESCRIPTION OF THE FIGURES

Various objects, features, and advantages of the present disclosure can be more fully appreciated with reference to the following detailed description when considered in connection with the following drawings, in which like reference numerals identify like elements. The following drawings are for the purpose of illustration only and are not intended to be limiting of this disclosure, the scope of which is set forth in the claims that follow.

DESCRIPTION

While aspects of the subject technology are described herein with reference to illustrative examples for particular applications, it should be understood that the subject technology is not limited to those particular applications. Those skilled in the art with access to the teachings provided herein will recognize additional modifications, applications, and aspects within the scope thereof and additional fields in which the subject technology would be of significant utility.

To meet the increasing performance demands of modern datacenter and high performance computing applications, device architectural improvements are needed to maintain performance momentum in view of slowing process node improvements. In particular, packet processing devices such as switches may be configured to use hyperscalar packet processing, which enables high performance packet processing of multiple packets concurrently using efficient hardware implementations. In this application, the term hyperscalar packet processing refers to utilization of a combination of architectural features enabling hardware accelerated processing of multiple network packets concurrently in a given clock cycle. For example, rather than using the same packet processing for all packets, packets may be processed through limited processing blocks (LPBs) or full processing blocks (FPBs) according to packet complexity. Further, processing blocks may be placed in physical circuit group layouts that implement intelligent sharing of logic and lookups to reduce total circuit area, thereby lowering power consumption and reducing die size.

Hyperscalar packet processing may be especially relevant for high performance computing (HPC) applications, which may generate a large number of small sized control packets with strict latency requirements. These control packets may not require the same amount of packet processing as a data packet. By utilizing multiple LPBs, such control packets can be quickly processed at a high rate while providing very low latency. Further, since the LPBs may support a limited feature set, the LPBs can be configured to process more than one packet during a clock cycle compared to FPBs that process one packet though an complete feature pipeline, further improving bandwidth and performance.

Figure 1A:
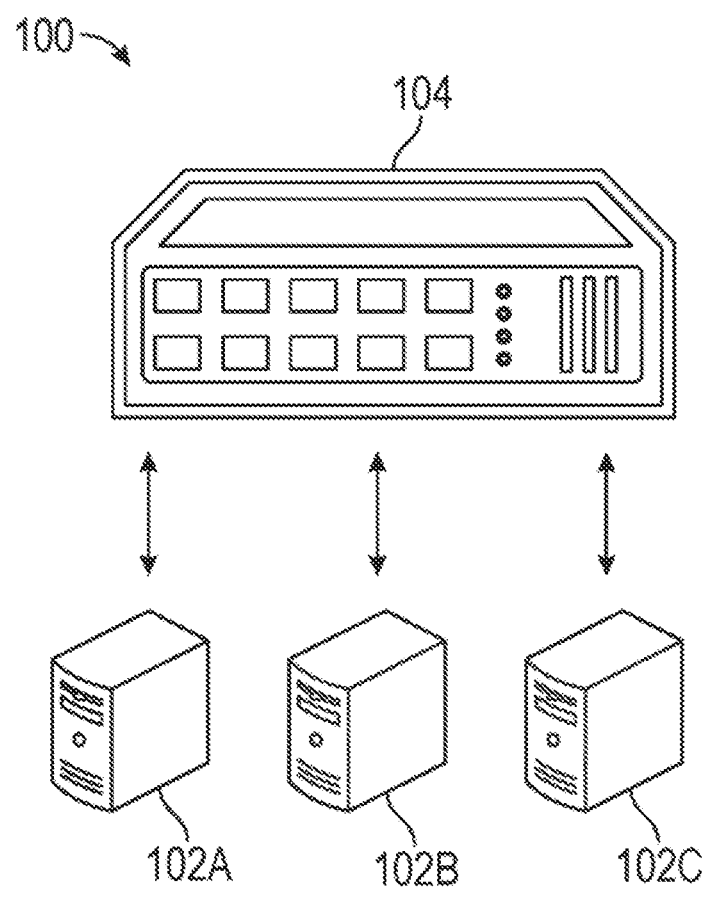
FIG. 1A depicts an example network environment in which hyperscalar packet processing may be implemented, according to various aspects of the subject technology.

FIG. 1A depicts an example network environment 100 for providing hyperscalar packet processing, according to various aspects of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes one or more electronic devices 102A-C connected via a network switch 104. The electronic devices 102A-C may be connected to the network switch 104, such that the electronic devices 102A-C may be able to communicate with each other via the network switch 104. The electronic devices 102A-C may be connected to the network switch 104 via wire (e.g., Ethernet cable) or wirelessly. The network switch 104, may be, and/or may include all or part of, the network switch discussed below with respect to the ingress/egress packet processing 105 of FIG. 1B and/or the electronic system discussed below with respect to FIG. 5. The electronic devices 102A-C are presented as examples, and in other implementations, other devices may be substituted for one or more of the electronic devices 102A-C.

For example, the electronic devices 102A-C may be computing devices such as laptop computers, desktop computers, servers, peripheral devices (e.g., printers, digital cameras), mobile devices (e.g., mobile phone, tablet), stationary devices (e.g. set-top-boxes), or other appropriate devices capable of communication via a network. In FIG. 1A, by way of example, the electronic devices 102A-C are depicted as network servers. The electronic devices 102A-C may also be network devices, such as other network switches, and the like.

The network switch 104 may implement the hyperscalar packet processing described herein. Ingress/egress packet processing 105 of an example network switch 104 implementing the subject system is discussed further below with respect to FIG. 1B, and example processes of the network switch 104 implementing the subject system are discussed further below with respect to FIG. 4.

The network switch 104 may implement hyperscalar packet processing, which refers to a combination of several features that optimize circuit integration, reduce power consumption and latency, and improve performance for packet processing. Packet processing may include several different functions such as determining a correct port to forward a packet to its destination, gathering diagnostic and performance data such as network counters, and performing packet inspection and traffic categorization for implementing quality of service (QoS) and other load balancing and traffic prioritizing functions. Some of these functions may require more complex processing than other functions. Thus, one feature of hyperscalar packet processing is to provide two different packet processing blocks and arbitrate packets accordingly: a limited processing block (LPB) and a full processing block (FPB). Since packets may vary widely in the amount of required processing, it is wasteful to process all types of packets using a one size fits all packet processing block. By utilizing LPBs, smaller packets with less processing requirements can be quickly processed to provide very low latency. Further, since the LPBs may support a limited feature set, the LPBs can be configured to process more than one packet during a clock cycle compared to FPBs that process one packet, improving bandwidth and performance.

The number of LPBs and FPBs can be adjusted according to workload. The LPBs and FPBs may correspond to logical packet processing blocks in the Figures. However, in some implementations, the LPBs and FPBs may correspond to physical packet processing blocks or some combination thereof. For example, latency sensitive applications and transactional databases may prefer designs with a larger number of LPBs to handle burst traffic of smaller control packets. On the other hand, applications requiring sustained bandwidth of large packets such as content delivery networks or cloud backup may prefer designs with a larger number of FPBs.

Another feature is to organize processing blocks into physical groups providing a single logical structure with circuitry, such as logic and lookups, shared between the processing blocks to optimize circuit area and power consumption. Such grouped processing blocks may be able to process packets from multiple data paths, with corresponding data structures provided to allow coherent and stateful processing of packets. This may also enable an aggregate processing block to provide greater bandwidth to better absorb burst traffic and provide reliable response time in comparison to individual processing blocks with independent pipes that may become easily saturated, especially with increasing port speed requirements.

Another feature is to use a single shared bus and arbiter for all interfaces, allowing efficient utilization of available system bus bandwidth. The arbiter may enforce packet spacing rules and allow auxiliary commands to be processed when no packets are processed during a cycle.

Another feature is to provide slot event queues for data paths and a scheduler to enforce spacing rules and control the posting of events. By providing these features, events are not blocked by worst case data path latency, helping to further reduce latency and improve response time.

Figure 1B:
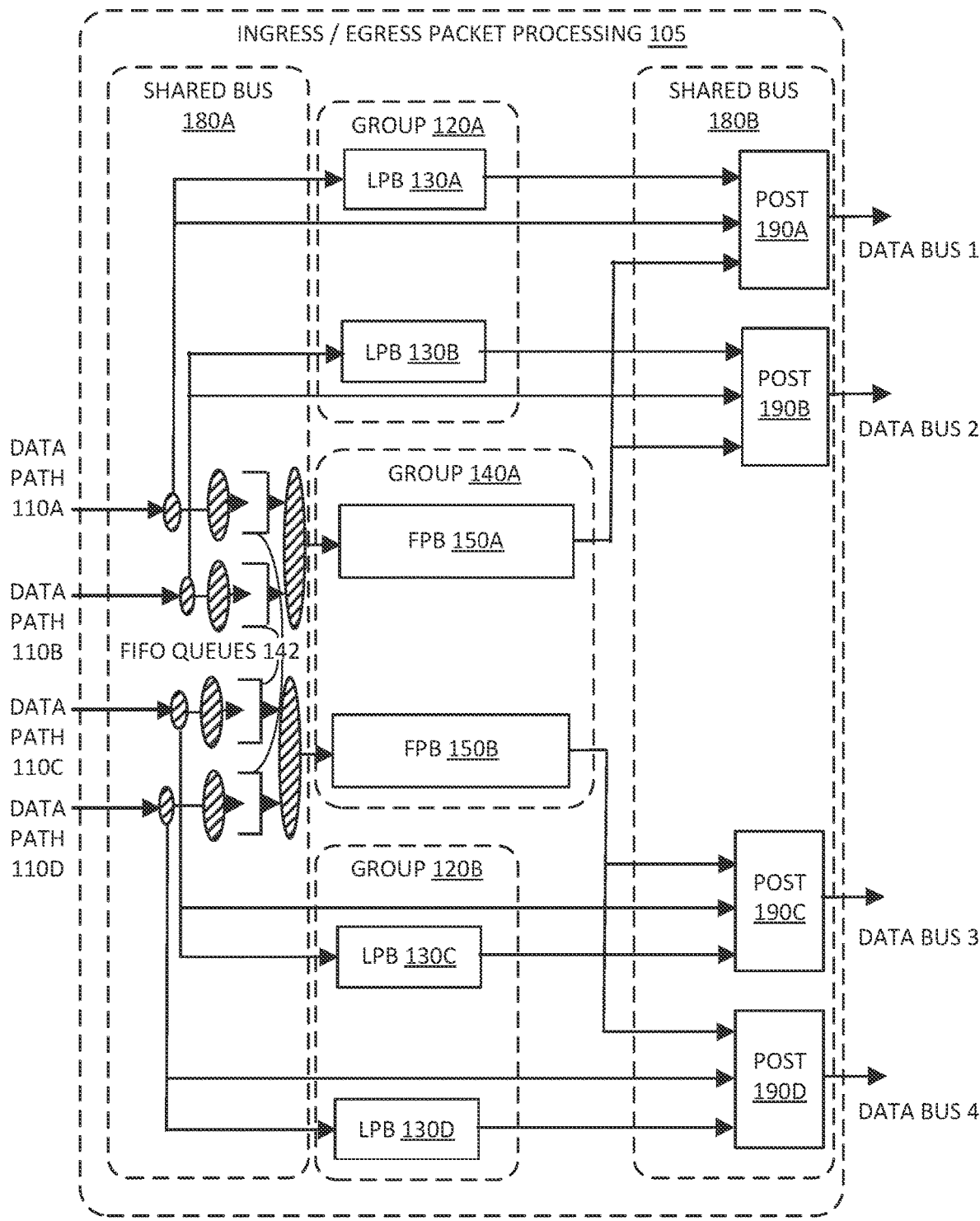
FIG. 1B depicts a logical block diagram of ingress/egress packet processing within an example network switch for providing hyperscalar packet processing, according to various aspects of the subject technology.

FIG. 1B depicts a logical block diagram of ingress/egress packet processing 105 of an example network switch 104 for providing hyperscalar packet processing, according to various aspects of the subject technology. While ingress packet processing is discussed in the below examples, ingress/egress packet processing 105 may also be adapted to egress packet processing. Ingress/egress packet processing 105 includes group 120A, group 120B, group 140A, first in first out (FIFO) queues 142, shared bus 180A, shared bus 180B, post 190A, post 190B, post 190C, and post 190D. Group 120A includes LPB 130A and LPB 130B. Group 120B includes LPB 130C and LPB 130D. Group 140A includes FPB 150A and FPB 150B. It should be understood that the specific layout shown in FIG. 1B is exemplary, and in other implementations any combination, grouping, and quantity of LPBs and FPBs may be provided.

As shown in FIG. 1B, data path 110A, data path 110B, data path 110C, and data path 110D may receive data packets that are arbitrated via shared bus 180A and shared bus 180B through various packet processing and posting blocks. The shared bus 180A and 180B may allow for more efficient bandwidth utilization across high speed interconnects compared to separate individual buses with smaller bandwidth capacities. Packets may, for example, be analyzed based on packet size. If a packet is determined to be at or below a threshold packet size, such as 64 bytes, 290 bytes, or another value, then the packet may be arbitrated to one of the limited processing blocks, or LPB 130A-130D. This threshold packet size may be stored as a rule of an arbitration policy. Besides packet size, the arbitration policy rules may also arbitrate based on fields in the packet headers such as a packet type field, a source port number, or any other field. For example, if a type field indicates that a packet is a barrier or control packet rather than a data packet, then the packet may be arbitrated to one of the limited processing blocks. The additional arrows bypassing LPB 130A-130D in groups 120A-120B may correspond to e.g. data path 350 of FIG. 3B, wherein the data payload is separated and transferred on a separate path from the packet processing pipe.

Otherwise, if the packet is determined to exceed the threshold packet size or if the arbitration policy rules otherwise indicate that packet should be sent to a full processing block, then the packet may be arbitrated to one of the full processing blocks, or FPB 150A-150B. The arbitration policy may also assign data paths to specific processing blocks. For example, data path 110A is assigned to either LPB 130A or FPB 150A in FIG. 1B. However, in other implementations, a data path may be arbitrated to any available processing block. The enforcement of arbitration policy may be carried out by an arbiter of shared bus 180A and 180B, as described below in FIG. 2D.

As discussed above, each LPB 130A-130D may be capable of processing multiple packets in a single clock cycle, or two packets in the particular example shown. For example, each LPB 130A-130D may support a limited set of packet processing features, such as by omitting deep packet inspection and other features requiring analysis of packet payloads. Since the data payload does not need to be analyzed, the data payload may be sent separately outside of LPB 130A-130D. In this manner, the processing pipeline may be simplified and reduced in length and complexity, allowing multiple limited feature packet processing pipelines to be implemented within a physical circuit area that may be equal to a single full feature packet processing pipeline. Thus, up to 8 packets may be processed by LPB 130A-130D, wherein each LPB 130A-130D may send two processed packets to respective post 190A-190D.

On the other hand, each FPB 150A-150B may process a single packet in a single clock cycle. Thus, up to 2 packets may be processed by FPB 150A-150B, wherein FPB 150A may send a processed packet to post 190A or post 190B, and FPB 150B may send a processed packet to post 190C or 190D. Post 190A-190D may perform post-processing by e.g. reassembling the processed packets with the separated data payloads, if necessary, and further preparing the assembled packets for sending on a data bus, which may include serializing the data packets. After post 190A-190D, the serialized and processed packets may be sent on respective data buses 1-4, which may further connect to a memory management unit (MMU).

Data paths 110A-110D may specifically correspond to ingress data buses in FIG. 1B. However, a similar design may be utilized for outputting to egress buses. Thus, when ingress/egress packet processing 105 corresponds to egress packet processing, data paths 110A-110D may correspond to post buses from the MMU, and post 190A-190D may output to respective egress data buses, which may further connect to upstream network data ports.

Groups 120A, 120B, and 140A may be organized to more efficiently share and utilize circuitry between and within the processing blocks contained in each group. In this way, circuit integration can be optimized, power consumption and latency can be reduced, and performance can be improved. For example, groups 120A, 120B, and 140A may share logic and lookups within each group to reduce total circuit area, as described in FIG. 2C. The reduced circuit area may consume less power. Group 140A may provide data structures to allow coherent and stateful processing of packets in an aggregate pipe, as described in FIG. 2F. Groups 120A-120B and 140A may further utilize separate data and processing pipelines described in FIG. 2C, FIG. 3A and FIG. 3B. Shared bus 180A and 180B may include arbiter 250 described in FIG. 2D.

Figure 2A:
FIG. 2A depicts an example system for processing a single packet from a single data path, according to various aspects of the subject technology.

FIG. 2A depicts an example system for processing a single packet from a single data path, according to various aspects of the subject technology. As shown in FIG. 2A, a single data path, or data path 110A, is processed by a single full processing block, or FPB 150A. FPB 150A includes single packet processing 210, which is able to process a single packet of any size for each clock cycle. Data path 110A and single packet processing 210 may share the same clock signal frequency. In a packet processing device, the system of FIG. 2A may be duplicated for a number of data paths to support, which may correspond to a number of network ports.

Packets to be processed may include a head of packet (HOP) that includes a start of packet (SOP) indication and a number of bytes to be processed, a payload, and a tail of packet (TOP) that includes packet size and error information. The portions of the packet to be processed may be referred to the start and end of packet (SEOP), whereas the payload may be bypassed using a separate non-processing pipe.

Figure 2B:
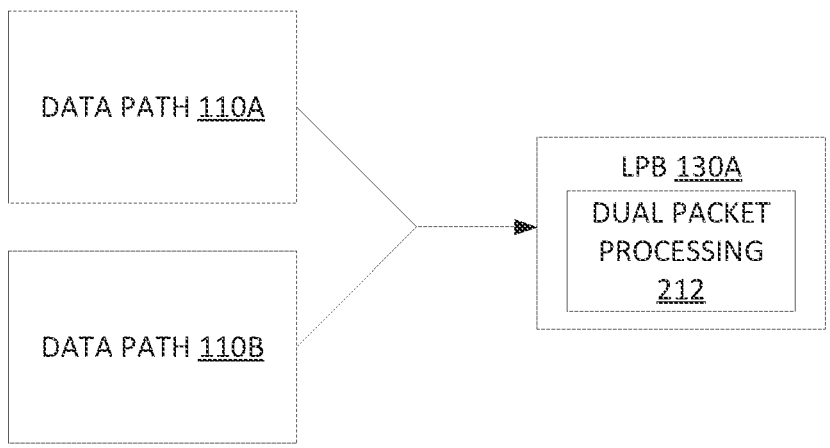
FIG. 2B depicts an example system for processing dual packets from two data paths, according to various aspects of the subject technology.
Figure 3A:
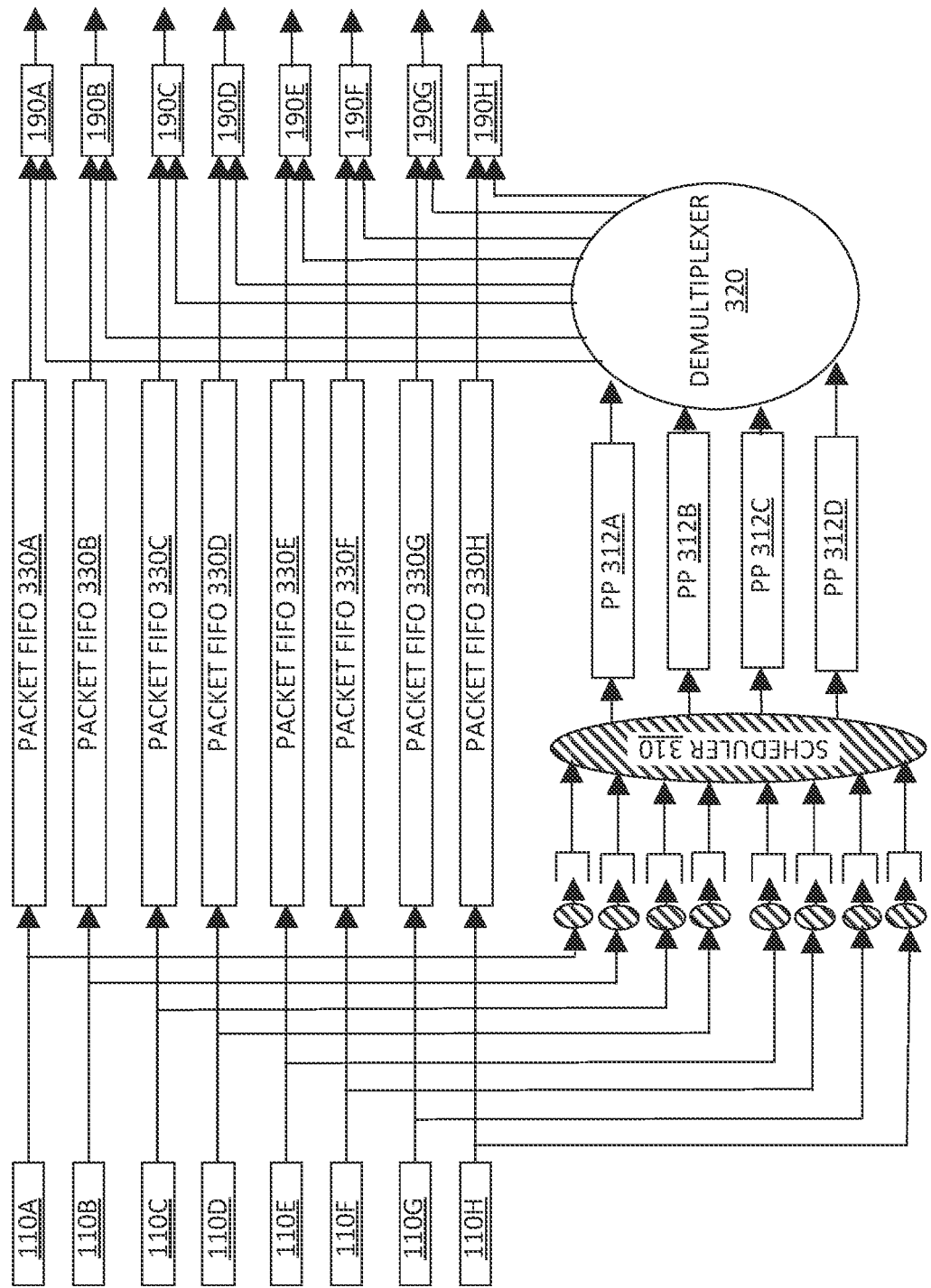
FIG. 3A depicts an example system for supporting 8 data paths through 4 packet processing blocks, according to various aspects of the subject technology.

FIG. 2B depicts an example system for processing dual packets from data paths 110A and 110B, according to various aspects of the subject technology. As discussed above, a key insight is that packets may vary widely in the amount of required processing. When a packet is below a processing threshold, which can correspond to a packet size threshold, then the packet may be processed using a limited processing block such as LPB 130A. LPB 130A may be implemented using a far less complex circuit design compared to FPB 150A, which supports all possible functionality of all packets. Thus, LPB 130A can provide dedicated hardware to process multiple packets from multiple data paths in a single clock cycle. Dual packet processing 212 may process a packet from each of data paths 110A and 110B in a single clock cycle. Further, since LPB 130A is a separate block from FPB 150A, packets processed through LPB 130A can be completed quicker for lower latency. For example, as discussed above, the processing pipeline for LPB 130A may be significantly shorter than for FPB 150A. In one implementation, a minimum latency for processing a packet through LPB 130A may be approximately 25 ns, whereas a minimum latency for processing a packet through FPB 150A may be approximately 220 ns. While two (2) data paths are shown in FIG. 2B, the concept of FIG. 2B may be extended to multiple data paths, such as eight (8) data paths as shown in FIG. 3A.

Figure 2C:
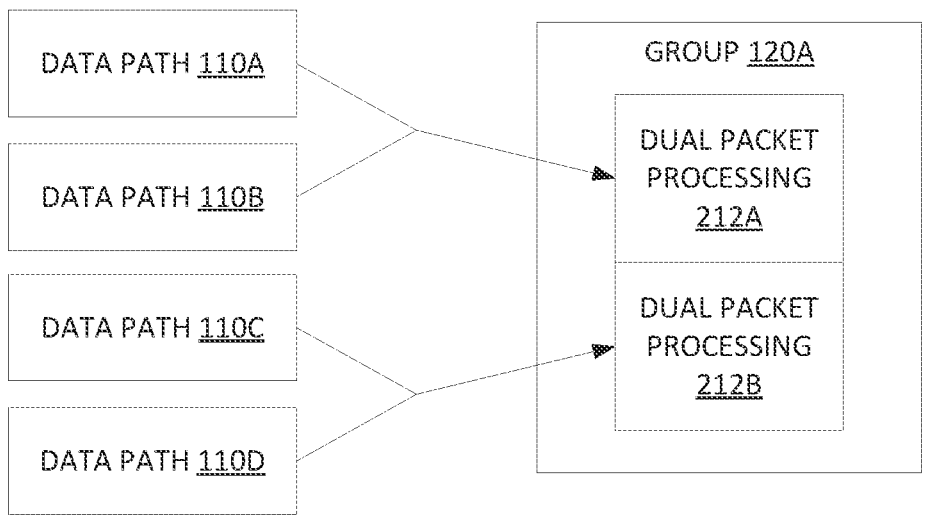
FIG. 2C depicts an example system for logically grouping two dual packet processing blocks together, according to various aspects of the subject technology.

FIG. 2C depicts an example system for logically grouping dual packet processing 212A and 212B together, according to various aspects of the subject technology. Group 120A includes dual packet processing 212A and 212B, which may be physically in proximity in a circuit layout. This proximity allows dual packet processing 212A and 212B to share logic and lookups for optimizing circuit area. At the same time, group 120A may also be logically grouped together to present a single logical processing block, for example by sharing logical data structures such as table structures. The incoming data packets from data paths 110A-110D may be arbitrated through a shared bus, such as shared bus 180A of FIG. 1B. To determine which processing block to route a data packet, an arbiter may be used, such as arbiter 250 of FIG. 2D.

Figure 2D:
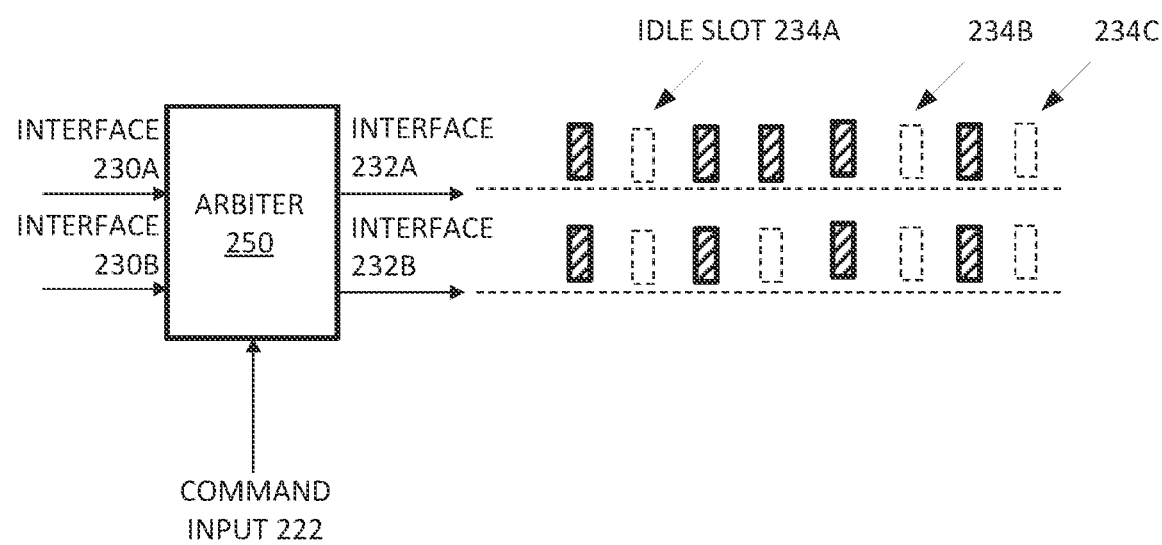
FIG. 2D depicts an example system for using an arbiter on a shared bus to enforce arbitration policy, according to various aspects of the subject technology.

FIG. 2D depicts an example system for using arbiter 250 on a shared bus to enforce arbitration policy, according to various aspects of the subject technology. While arbiter 250 is shown to include two input interfaces 230A-230B and two output interfaces 232A-232B, it should be understood that the number of interfaces can be scaled according to the bus arbitration requirements, e.g. as in shared bus 180A and 180B. Thus, shared bus 180A and 180B may include a respective arbiter 250. Arbiter 250 may receive packets from multiple data paths, or interface 230A and 230B. Arbiter 250 may therefore be used to arbitrate multiple data paths through a single, shared bus for improved interconnect bandwidth utilization. Based on packet size arbitration rules and packet spacing rules defined in an arbitration policy, arbiter 250 may output packets for processing via interface 232A and 232B, which may further connect to packet processing blocks. The packet spacing rules may be enforced on a per-group basis. For example, the packet spacing rules may enforce a minimum spacing between certain packets according to data dependency, traffic management, pipelining rules, or other factors. For example, to reduce circuit complexity and power consumption, pipelines may be simplified to support successive commands of a particular type, e.g. table initialization commands, only after a full pipeline is completed, e.g. 20 cycles. Thus, when such a table initialization command is encountered, the packet spacing rules may enforce a minimum spacing of 20 cycles before another table initialization command can be processed. The arbitration policy may also enforce assignment of data paths to certain interfaces, which may allow table access structures to be implemented in a simplified manner, e.g. by reducing multiplexer and de-multiplexer lines.

When no packets are to be processed in a group, such as during idle slot 234A, 234B, and 234C, arbiter 250 may output ancillary or auxiliary commands received from command input 222, which may be received from a centralized control circuit. For example, the ancillary commands may perform bookkeeping, maintenance, diagnostics, and other functions outside of the normal packet processing functionality.

Figure 2E:
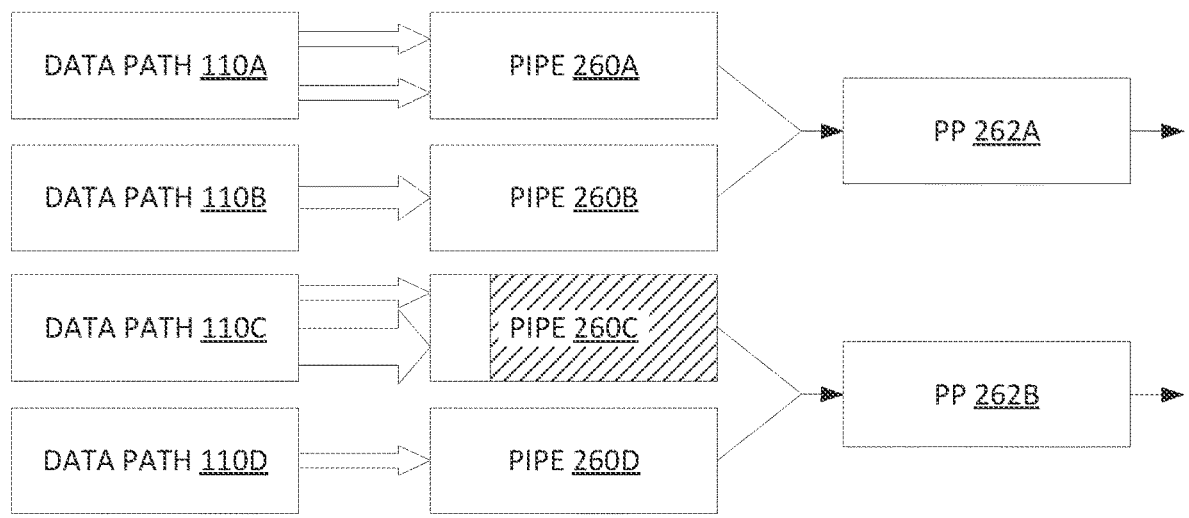
FIG. 2E depicts an example system for arbitrating data paths through individual packet processing pipes, according to various aspects of the subject technology.

FIG. 2E depicts an example system for routing data paths 110A-110D through individual packet processing pipes, or pipes 260A-260D arbitrating into packet processing (PP) 262A-262B, according to various aspects of the subject technology. Pipes 260A-260D may correspond to FIFO queues 142 from FIG. 1B. Each PP 262A-262B may be include a full processing block, similar to FPB 150A. The amount of packet data being sent through each data path 110A-110D may be represented visually by the thickness of the arrows. As shown in FIG. 2E, this may result in packet congestion at pipe 260C due to the large burst of packet data from data path 110C. As a result, packets may be significantly delayed or dropped before reaching PP 262B.

Figure 2F:
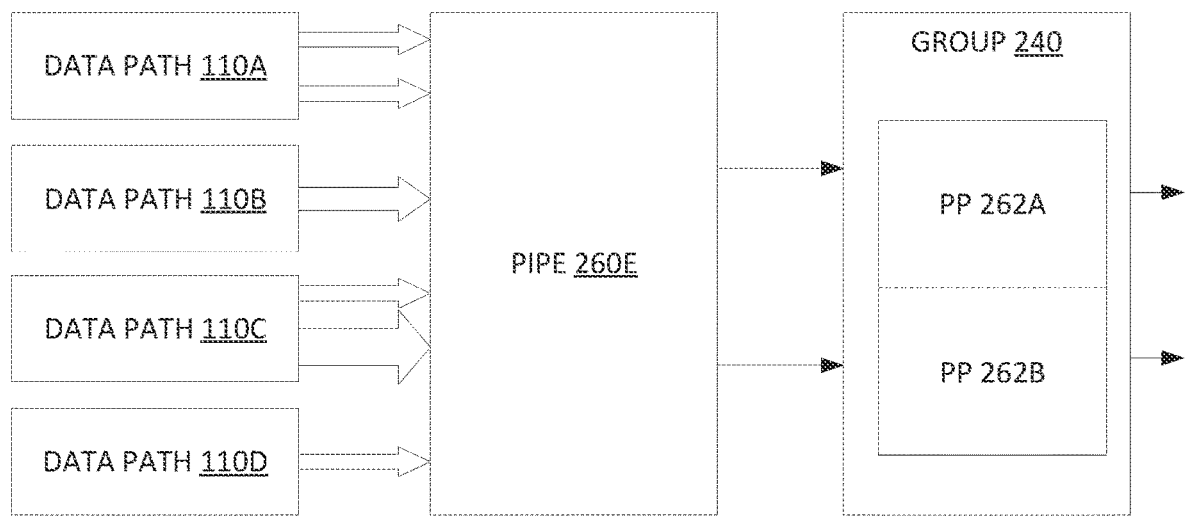
FIG. 2F depicts an example system for arbitrating data paths through an aggregate packet processing pipe, according to various aspects of the subject technology.

FIG. 2F depicts an example system for arbitrating data paths 110A-110D through an aggregate packet processing pipe, or pipe 260E, according to various aspects of the subject technology. As shown in FIG. 2F, rather than processing through independent pipes 260A-260D, a single aggregate pipe 260E is provided, which may support combined bandwidth corresponding to the sum of pipes 260A-260D. This allows pipe 260E to better handle burst traffic from any of data paths 110A-110D, helping to avoid latency and dropped packets. However, this may result in multiple packets from the same flow or data path to be processed in a single cycle by group 240. To support this, data structures may be provided to enable coherent and stateful processing of packets in group 240.

For example, hardware data structures may be provided such that counters, meters, elephant traps (ETRAPs) and other structures may be accessible for concurrent reads and writes across PP 262A-262B, even when processing packets from the same data path. Such hardware data structures for group 240 may include four 4 read, 1 write structures, or two 4 read, 2 write structures, or one 4 read, 4 write structure.

Figure 2G:
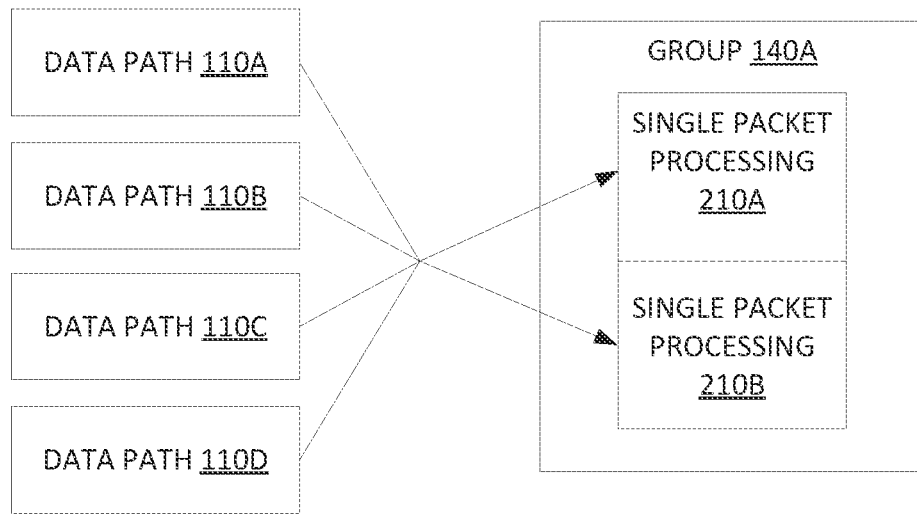
FIG. 2G depicts an example system combining the logical grouping of FIG. 2C with the aggregate packet processing pipe of FIG. 2F, according to various aspects of the subject technology.

FIG. 2G depicts an example system combining the logical grouping of FIG. 2C with the aggregate packet processing pipe of FIG. 2F, according to various aspects of the subject technology. As shown in FIG. 2G, any of data paths 110A-110D may be processed by either single packet processing 210A or 210B. For example, arbiter 250 as shown in FIG. 2D may be provided in a shared bus to arbitrate the packets into group 140A. As with group 240 in FIG. 2F, group 140A may receive packets from an aggregate pipe. Thus, group 140A may include similar hardware data structures to support coherent and stateful processing.

Figure 2H:
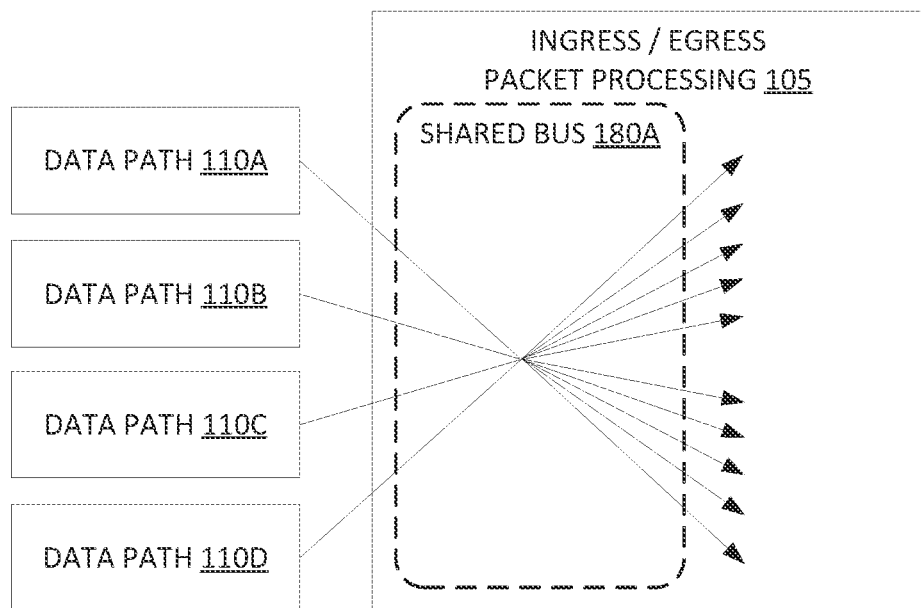
FIG. 2H depicts an example system combining the features shown in FIG. 2A-2G to provide hyperscalar packet processing, according to various aspects of the subject technology.

FIG. 2H depicts an example system combining the features shown in FIG. 2A-2G to provide hyperscalar packet processing, according to various aspects of the subject technology. As shown in FIG. 2H, four data paths 110A-110D may be processed through ingress/egress packet processing 105 of network switch 104, which may implement the features described in FIG. 2A-2G to provide hyperscalar packet processing. For example, referring to FIG. 1B, up to 10 packets may be processed by network switch 104 in a single cycle.

FIG. 3A depicts an example system for supporting 8 data paths, or data paths 110A-110H, through 4 packet processing blocks, or PP 312A-312D, according to various aspects of the subject technology. PP 312A-312D may correspond to LPBs. As shown in FIG. 3A, data paths may be separated into packet first in first out (FIFO) 330A-330H for payloads, and FIFOs entering scheduler 310 for packet data to be processed. Packet FIFO 330A-330H may provide a path for packet data to be transferred without processing, whereas scheduler 310 may receive SEOP data into FIFO queues for processing. Each PP 312A-312D may process two packets in a single cycle, which is then output to demultiplexer 320 to separately send to post 190A-190H. The processed SEOP may be reassembled with an output from the corresponding packet FIFO 330A-330H at respective post 190A-190H for outputting to respective data buses.

Figure 3B:
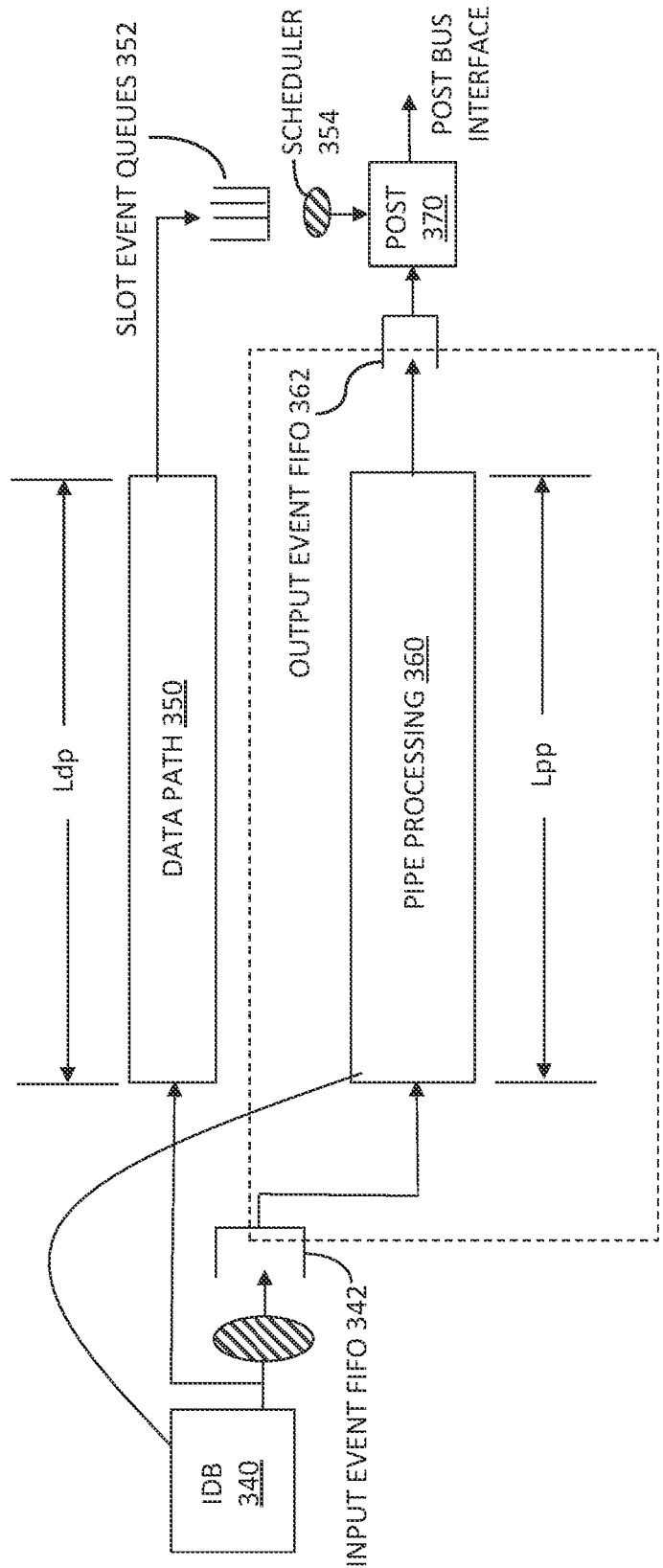
FIG. 3B depicts an example system for reducing latency by providing slot event queues and a scheduler to read out events, according to various aspects of the subject technology.

FIG. 3B depicts an example system for reducing latency by providing slot event queues 352 and scheduler 354 to read out events, according to various aspects of the subject technology. The system of FIG. 3B may, for example, be implemented in a FPB such as FPB 150A or FPB 150B. Ldp represents a total latency of data path 350, whereas Lpp represents a total latency of pipe processing 360. Packets may be read from ingress data buffer 340, with the payload proceeding through data path 350 and the SEOP proceeding through input event FIFO 342 for pipe processing 360. By providing slot event queues 352 and scheduler 354, additional latency from emptying the worst case occupancy of input event FIFO 342 can be avoided. For example, scheduler 354 may be configured to post SOP events to post 370 only when the SOP event is present in both output event FIFO 362 and slot event queues 352. Other events in slot event queues 352 may be posted when on the head.

Figure 4:
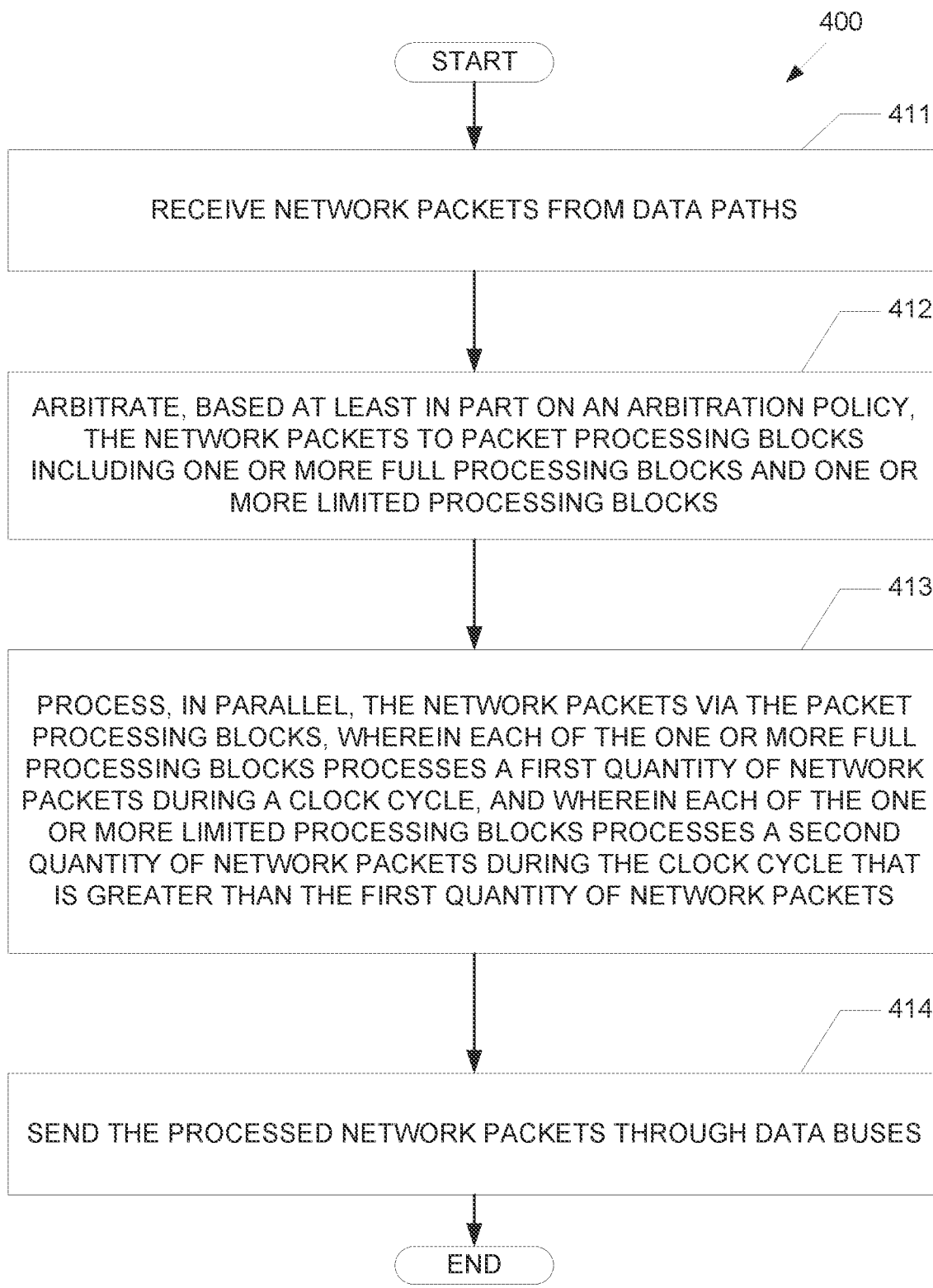
FIG. 4 depicts an example process for using hyperscalar packet processing to optimize circuit integration, reduce power consumption and latency, and improve performance, according to various aspects of the subject technology.

FIG. 4 depicts an example process 400 for using hyperscalar packet processing to optimize circuit integration, reduce power consumption and latency, and improve performance, according to various aspects of the subject technology. For explanatory purposes, the various blocks of example process 400 are described herein with reference to FIGS. 1-3B, and the components and/or processes described herein. The one or more of the blocks of process 400 may be implemented, for example, by a computing device, including a processor and other components utilized by the device. In some implementations, one or more of the blocks may be implemented apart from other blocks, and by one or more different processors or devices. Further for explanatory purposes, the blocks of example process 400 are described as occurring in serial, or linearly. However, multiple blocks of example process 400 may occur in parallel. In addition, the blocks of example process 400 need not be performed in the order shown and/or one or more of the blocks of example process 400 need not be performed.

In the depicted example flow diagram, network packets are received from data paths (411). Referring to FIG. 1B, this may correspond to receiving network packets from data paths 110A-110D.

Process 400 may continue with arbitrating, based at least in part on an arbitration policy, the network packets to packet processing blocks including one or more full processing blocks and one or more limited processing blocks (412). Thus, the network packets may be arbitrated to FPB 150A-150B and/or LPB 130A-130D, for example by using arbiter 250 in shared bus 180A. As shown in FIG. 1B, FIFO queues 142 may be provided for FPB 150A-150B.

Process 400 may continue with processing, in parallel, the network packets via the packet processing blocks, wherein each of the one or more full processing blocks processes a first quantity of network packets during a clock cycle, and wherein each of the one or more limited processing blocks processes a second quantity of network packets during the clock cycle that is greater than the first quantity of network packets (413). For example, the first quantity may correspond to one, and the second quantity may correspond to at least twice the first quantity, such as two. Thus, within a given clock cycle, FPB 150A-150B and LPB 130A-130D may process up to 10 packets.

Process 400 may continue with sending the processed plurality of network packets through a plurality of data buses (414). For example, the processed network packets may be reassembled and serialized via post 190A-190D to be sent via respective data buses 1-4. An arbiter similar to arbiter 250 may be provided to enforce packet spacing rules at post 190A-190D within shared bus 180B.

Many aspects of the above-described example process 400, and related features and applications, may also be implemented as software processes that are specified as a set of instructions recorded on a computer readable storage medium (also referred to as computer readable medium), and may be executed automatically (e.g., without user intervention). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

The term "software" is meant to include, where appropriate, firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
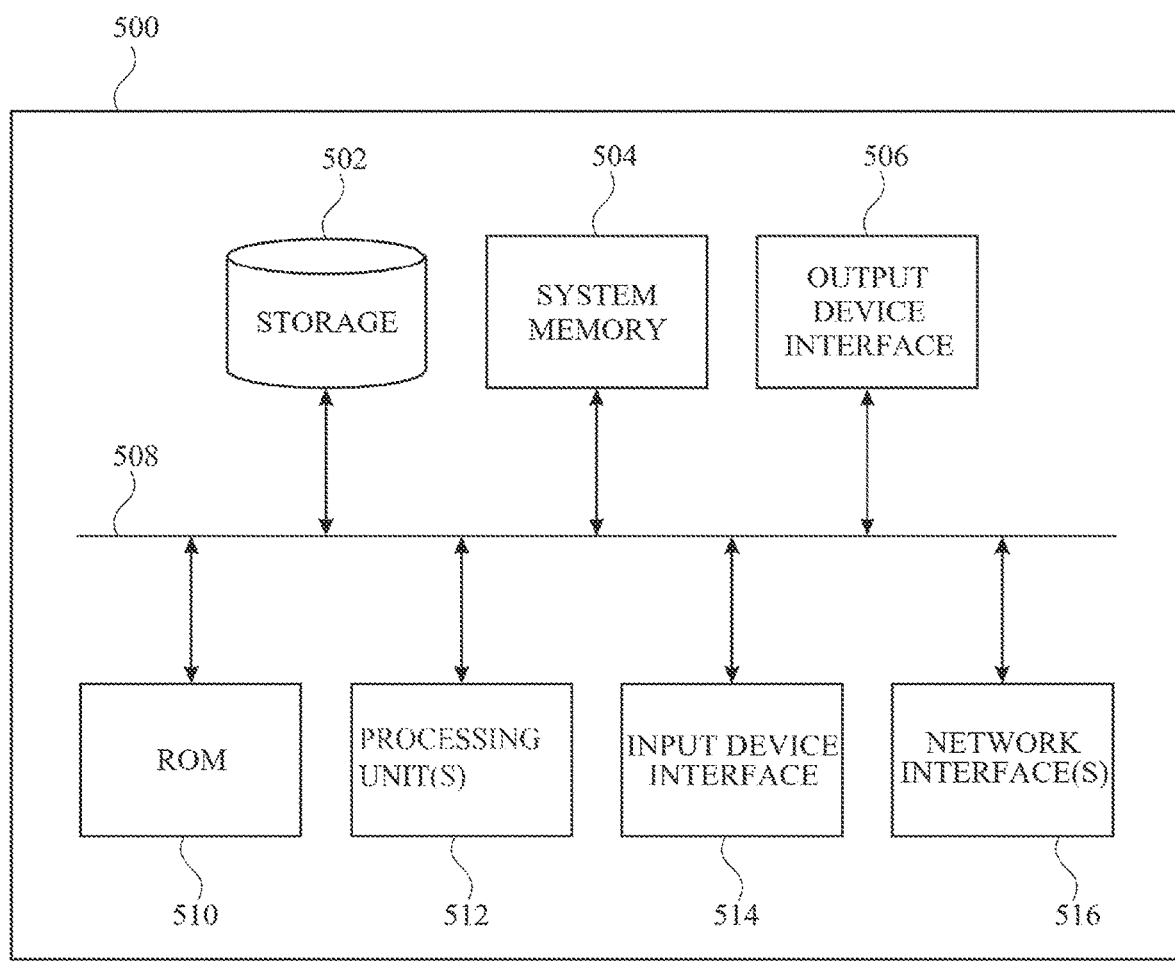
FIG. 5 illustrates an electronic system with which one or more implementations of the subject technology may be implemented.

FIG. 5 illustrates an electronic system 500 with which one or more implementations of the subject technology may be implemented. The electronic system 500 can be, and/or can be a part of, the network switch 104 shown in FIG. 1B. The electronic system 500 may include various types of computer readable media and interfaces for various other types of computer readable media. The electronic system 500 includes a bus 508, one or more processing unit(s) 512, a system memory 504 (and/or buffer), a ROM 510, a permanent storage device 502, an input device interface 514, an output device interface 506, and one or more network interfaces 516, or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are needed by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processing unit(s) 512 may need at runtime. In one or more implementations, the processes of the subject disclosure are stored in the system memory 504, the permanent storage device 502, and/or the ROM 510. From these various memory units, the one or more processing unit(s) 512 retrieves instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 also couples the electronic system 500 to one or more networks and/or to one or more network nodes, through the one or more network interface(s) 516. In this manner, the electronic system 500 can be a part of a network of computers (such as a LAN, a wide area network ("WAN"), or an Intranet, or a network of networks, such as the Internet. Any or all components of the electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   receiving a plurality of network packets from a plurality of data paths;
   arbitrating, based at least in part on an arbitration policy, the plurality of network packets to a plurality of packet processing blocks comprising one or more full processing blocks and one or more limited processing blocks;
   processing, during a clock cycle, a first quantity of network packets using one of the one or more full processing blocks;
   processing, during the clock cycle, a second quantity of network packets using one of the one or more limited processing blocks, wherein processing the second quantity of network packets using one of the one or more limited processing blocks comprises:
      placing a data payload from a network packet of the second quantity of network packets in a first buffer;
      placing start and end of packet data from the network packet in a second buffer;
      processing the start and end of packet data using the limited processing block; and
      reassembling the packet data with the processed start and end of packet data; and
   sending the processed first and second quantities of network packets through a plurality of data buses,
   wherein the plurality of network packets are processed in parallel, and wherein the second quantity of network packets is greater than the first quantity of network packets.

2. The method of claim 1, wherein arbitrating, based at least in part on the arbitration policy, the plurality of network packets comprises:
   determining a packet type based on a packet type field for each respective packet; and
   routing each respective packet to one of the one or more full processing blocks or the one or more limited processing blocks based on the determined packet type.

3. The method of claim 1, wherein arbitrating, based at least in part on the arbitration policy, the plurality of network packets comprises:
   for each respective packet of the plurality of network packets:
      determining a packet size for each respective packet;
      routing each respective packet to the one or more full processing blocks when the packet size exceeds a threshold packet size of the arbitration policy; and
      routing each respective packet to the one or more limited processing blocks when the packet size does not exceed the threshold packet size of the arbitration policy.

4. The method of claim 1, wherein the one or more limited processing blocks are grouped into shared logical limited processing engines comprising at least two of the one or more limited processing blocks with shared logic and lookup hardware.

5. The method of claim 1, wherein arbitrating comprises queuing ancillary operations into the plurality of packet processing blocks that are not processing any of the plurality of network packets.

6. The method of claim 1, wherein the second quantity of network packets is at least twice the first quantity of network packets.

7. The method of claim 1, wherein the first quantity of network packets is one.

8. The method of claim 1, wherein arbitrating the plurality of network packets comprises arbitrating, for each of the one or more full processing blocks, into at least one first in first out (FIFO) queue.

9. The method of claim 1, wherein the one or more full processing blocks are grouped into shared full processing engines comprising at least two of the one or more full processing blocks with shared circuitry.

10. The method of claim 9, wherein each of the shared full processing engines utilize an aggregated packet processing pipe with coherent data access structures.

11. A system comprising:
a first shared bus with a first arbiter configured to receive a plurality of network packets from a plurality of data paths;
a plurality of packet processing blocks comprising one or more full processing blocks and one or more limited processing blocks, wherein each of the one or more full processing blocks is configured to process a first quantity of network packets during a clock cycle, and wherein each of the one or more limited processing blocks is configured to process during the clock cycle a second quantity of network packets that is greater than the first quantity of network packets;
wherein processing the second quantity of network packets using one of the one or more limited processing blocks comprises:
placing a data payload from a network packet of the second quantity of network packets in a first buffer;
placing start and end of packet data from the network packet in a second buffer;
processing the start and end of packet data using the limited processing block; and
reassembling the packet data with the processed start and end of packet data;
wherein the first arbiter is configured to arbitrate, based at least in part on an arbitration policy, the plurality of network packets for processing in parallel by the plurality of packet processing blocks; and
a second shared bus with a second arbiter configured to arbitrate, based at least in part on the arbitration policy, the processed plurality of network packets to a plurality of data buses.

12. The system of claim 11, wherein the first arbiter is configured to:
for each respective packet of the plurality of network packets:
determine a packet type based on a packet type field for each respective packet; and
route each respective packet to one of the one or more full processing blocks or the one or more limited processing blocks based on the determined packet type.

13. The system of claim 11, wherein the first arbiter is configured to:
for each respective packet of the plurality of network packets:
determine a packet size for each respective packet;
arbitrate each respective packet to the one or more full processing blocks when the packet size exceeds a threshold packet size of the arbitration policy; and
route each respective packet to the one or more limited processing blocks when the packet size does not exceed the threshold packet size of the arbitration policy.

14. The system of claim 11, wherein the one or more limited processing blocks are grouped into shared logical limited processing engines comprising at least two of the one or more limited processing blocks with shared logic and lookup hardware, and wherein the one or more full processing blocks are grouped into shared logical full processing engines comprising at least two of the one or more full processing blocks with shared logic and lookup hardware.

15. The system of claim 14, wherein each of the shared logical full processing engines comprises an aggregated packet processing pipe with coherent data access structures.

16. The system of claim 11, wherein the first arbiter is configured to queue ancillary operations into the plurality of packet processing blocks that are not processing any of the plurality of network packets.

17. The system of claim 11, wherein the second quantity of network packets is at least twice the first quantity of network packets.

18. The system of claim 11, wherein the first quantity of network packets is one.

19. The system of claim 11, wherein each of the one or more full processing blocks is further coupled to at least one first in first out (FIFO) queue.

20. A non-transitory storage medium comprising instructions that, when read by one or more processors, cause a method comprising:
receiving a plurality of network packets from a plurality of data paths;
arbitrating, based at least in part on an arbitration policy, the plurality of network packets to a plurality of packet processing blocks comprising one or more full processing blocks and one or more limited processing blocks;
processing, during a clock cycle, a first quantity of network packets using one of the one or more full processing blocks;
processing, during the clock cycle, a second quantity of network packets using one of the one or more limited processing blocks, wherein processing the second quantity of network packets using one of the one or more limited processing blocks comprises:
placing a data payload from a network packet of the second quantity of network packets in a first buffer;
placing start and end of packet data from the network packet in a second buffer;
processing the start and end of packet data using the limited processing block; and
reassembling the packet data with the processed start and end of packet data; and
sending the processed plurality of network packets through a plurality of data buses,
wherein the plurality of network packets are processed in parallel, and wherein the second quantity of network packets is greater than the first quantity of network packets.

* * * * *